Sept. 8, 1964 A. J. BURKE 3,148,251

CARD READER

Original Filed Sept. 10, 1958

2 Sheets-Sheet 1

INVENTOR

ARTHUR J. BURKE

BY Norris & Bateman

Sept. 8, 1964 A. J. BURKE 3,148,251

CARD READER

Original Filed Sept. 10, 1958

2 Sheets-Sheet 2

INVENTOR
ARTHUR J. BURKE

BY Norris & Bateman 3,148,251
CARD READER
Arthur J. Burke, Oakland, N.J., assignor to Howe, Richardson Scale Company, a corporation of Delaware
Original application Sept. 10, 1958, Ser. No. 760,107. Divided and this application Nov. 14, 1960, Ser. No. 73,935
9 Claims. (Cl. 200—46)

This invention relates to card readers particularly adapted for apparatus which automatically weigh ingredients in different desired proportions and amounts for operations such as blending, bagging, compounding and the like.

This is a division of my copending application Serial No. 760,107, filed September 10, 1958.

It is an object of this invention to select the desired weight by means of a pre-punched card through a novel card reader or patch board connected to the sequencing and control apparatus. Each separate formula to be mixed is punched in a coded pattern on a separate punched card record so that the proper weights of each ingredient results automatically following insertion of the punched card in the card reader, thereby eliminating any possible error in changing the controls on the weighing apparatus from one mixture to another. Further, permanent records may be made identifying the card used for setting up the weighing apparatus to verify correctness of formulating and to provide valuable data on amounts of ingredients used; formulations may be uncoded for privacy; and no special skills or training are necessary for the operator.

The punched card serves as a convenient storage record which is especially valuable to processors requiring quick change-overs of formulae. Each punched card represents a complete formula, can be used indefinitely and several cards can be used in any desired sequence.

Where patch boards are used in lieu of the punched cards and card reader, separate boards may be provided pre-wired for each different mixture of ingredients to be weighed. However, removable jumper wires may be provided for permitting an operator to change the mixture if desired.

A further object of the invention is to provide a novel bridge circuit for matching the electrical output from the transducer with the electrical output from the weight selection resistors to precisely control actuation of a relay in response to a weight in the weight hopper corresponding to the value of resistance provided by the weight selection resistors, and to provide a relay energized by the completion of the selection of the weight selection resistors for advancing the sequence of automatic operation.

Another major object of the present invention is to provide a novel card reader especially adapted for controlling the operation of the automatic weighing apparatus. The card reader is arranged so that the weighing apparatus may be operated for an indefinite period with one card, or a new card may be inserted for each different weightment. Means are provided for indicating the correct position of the card in the reader which snaps the card forward when the front edge of the card is pushed upwardly above the front card guide to facilitate removal of the card from the card reader.

These and other objects of the invention will become more fully apparent from the claims, and from the following description and appended drawings wherein:

Figure 3:
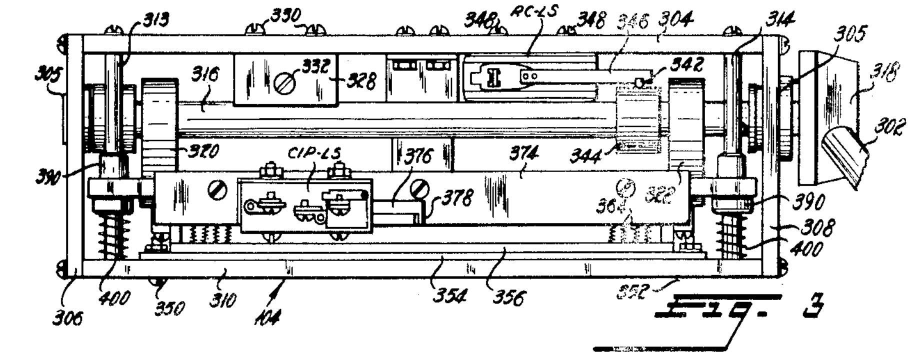
FIGURE 3 is a rear elevation view of the card reader and is positioned so as to be an orthographic projection along with FIGURES 1 and 2.
Figures 1, 2:
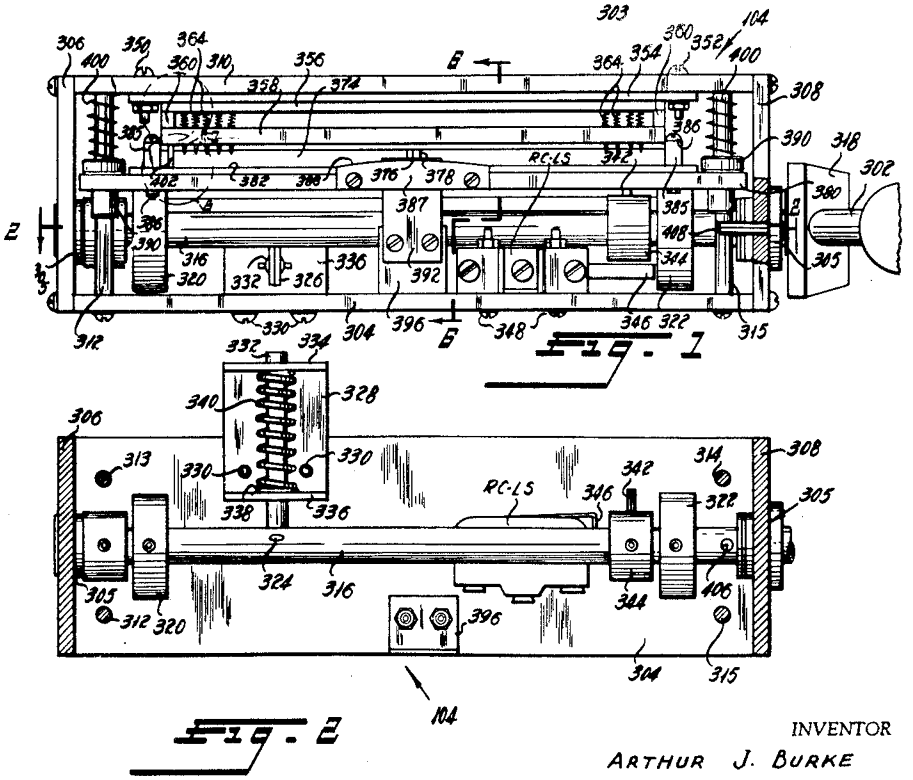
FIGURE 1 is a front elevation view of the novel card reader shown with the outside cover removed.
FIGURE 2 is a top plan view in section taken along line 2—2 of FIGURE 1.
Figure 4:
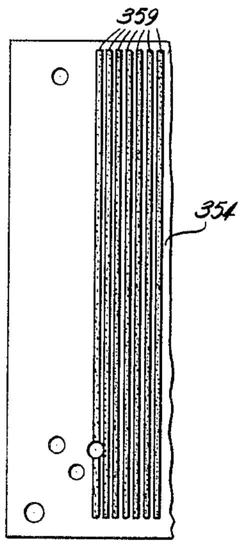
Figure 5:
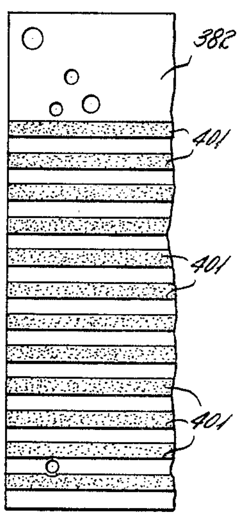
Figure 7:
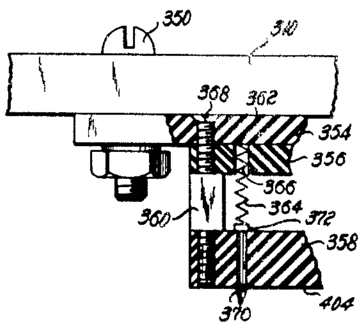
Figures 6, 8:
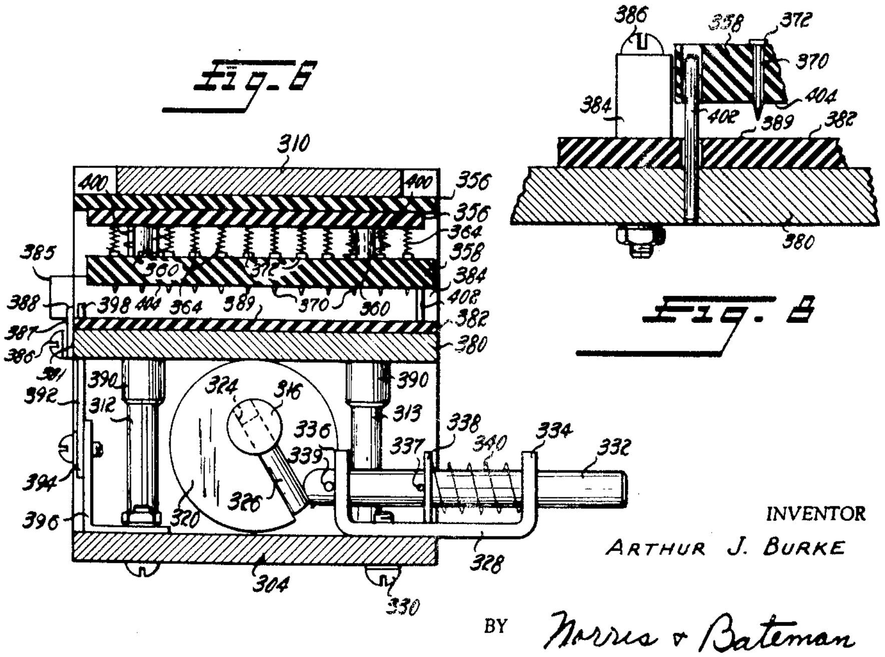

FIGURES 4 and 5 respectively are fragmentary plan views of the upper and lower printed circuit plates illustrated in FIGURES 1–3;

FIGURE 6 is a right side elevation view of the card reader taken along line 6—6 of FIGURE 1;

FIGURE 7 is a front elevation view in section enlarged to show the detailed construction of the upper printed circuit plate assembly and taken at dotted line circle 7 on FIGURE 1; and FIGURE 8 is a front elevation view in section enlarged to show the detailed construction of the lower printed circuit plate assembly and taken at dotted line circle 8 on FIGURE 1.

Card reader 104 of the present invention is illustrated in FIGURES 1–8 with the cover removed.

Referring now to FIGURES 1 through 8, the card reader comprises a base plate 304, end plates 306 and 308 and a top plate 310, all made of a suitable material such as aluminum, cold rolled steel or the like, and held together by several screws as shown in the drawings. Four polished stainless steel guide rods 312, 313, 314 and 315 are supported between base plate 304 and top plate 310. A main shaft 316 is journaled in suitable low-friction bearings 305 in end plates 306 and 308 and is connected by collar 318 to a handle 302 (FIGURE 3) which is manually swingable through an arc of between 90° and 180° to place the card reader in operating condition.

Mounted on main shaft 316 are a pair of cam members 320 and 322 at positions adjacent guide rods 312–315. Drill hole 324 is provided in main shaft 316 for receiving pin 326 best shown in FIGURE 6. Bracket 328 is secured to base plate 304 as with screws 330 and contains aligned holes for receiving card ejector spring shaft 332. Mounted on shaft 332 between bracket legs 334 and 336 are washer 338 and card ejector spring 340 which is shown compressed in FIGURE 6 as when the card reader is in the position causing ejection of the card and expanded in FIGURE 2 as it appears at all other times during operation of the card reader. Roll pin 337 prevents washer 338 from moving along ejector shaft 332 and pin 339 serves as a stop to limit rotation of main shaft 316 during the card ejection operation.

A further roll pin 342 is suitably mounted on main shaft 316 as with collar 344 to abut against the actuator blade 346 of card reader limit switch RC–LS (FIGURE 3) which is secured to base plate 304 as with screws 348. When main shaft 316 is rotated to the position where the card is being read, collar 344 is so adjusted that roll pin 342 causes the contacts in limit switch RC–LS to be closed.

Referring now to FIGURES 1, 3, 6 and 7 secured to top plate 310 as by fasteners 350 and 352 is the upper contact plate assembly, a partial section of which is shown enlarged in FIGURE 7. The upper contact plate assembly is formed on an upper printed circuit plate 354, a contact spring retaining plate 356 and a contact pin retaining plate 358. Pin retaining plate 358 is separated from spring retaining plate 356 by four brass spacers 360, one at each of the four corners of the rectangular plates 356 and 358.

Printed circuit plate 354, as shown in FIGURE 4, is made of glass impregnated epoxy resin with 80 vertical columns of conductive strips 359 made of a nickel plated copper, which are conventionally preferred materials disposed in a conventional manner for reading punched cards of the "IBM" type. Obviously, other printed circuit arrangements could be used to accommodate other types of punched cards.

The conductive strips 359 on the lower side of printed circuit plate 354 are adjacent the upper surface of contact spring retaining plate 356 and are in electrical contact with the upper ends 362 of pin springs 364. External wires are soldered to the ends of each of the 80 vertical columns of printed circuitry on upper plate 354.

Spring retaining plate 356 is made of a suitable insulating material such as a phenolic resin, and is formed with 960 through bores 366 for receiving upper ends 362 of 960 springs 364. Through apertures are also provided at the four corners for receiving screws 368 which fit into a suitable countersink in upper printed circuit plate 354, through spring retaining plate 356 and spacer 360 to be threaded in pin retaining plate 358.

Pin retaining plate 358, made of a suitable insulating material such as a glass impregnated epoxy resin, is provided with 960 through bores aligned with the corresponding number of through bores in spring retaining plate 356 to slidably receive an equal number of pins 370. Pins 370 have a pointed lower end adapted to pass through holes in a punched card and are provided with a shoulder 372 at their upper end which has a diameter larger than the diameter of the bores in pin retaining plate 358.

All 960 contact pins 370 are at all times in electrical contact with upper printed circuit plate 354 through contact springs 364 which lie compressed between shoulder 372 on pins 370 and the 80 conductive strips on the lower side of plate 354. Contact springs 364 are helical compression springs made of a beryllium copper alloy and provide a force sufficient to assure good electrical contact through holes in the punched card. The entire upper contact plate assembly is attached to top plate 310 of the card reader mechanism.

Rear card guide 374 (see FIGURE 3) is secured on the rear side of pin retaining plate 358 upon which is mounted limit switch CIP–LS, the contacts of which are adapted to be closed when the card is in place. Switch CIP–LS has an actuator arm 376 which has the free end bent at 90° to extend through slot 378 in rear card guide 374 to contact the rear edge of the card when it is properly positioned to be read by the card reader.

As disclosed in said copending parent application Serial No. 760,107, switches RC–LS and CIP–LS are connected in series circuit relationship and are required to be closed before a batch weighing operation can be initiated. Thus, a punched card must be properly placed in the reader to close switch contacts CIP–LS and, further, the card reader must be in read condition closing switch contacts RC–LS. The reader is in read condition in a manner to be presently described.

The lower printed circuit mounting assembly shown in enlarged detail in FIGURE 8 comprises a lower mounting plate 380 of a suitable material such as steel, a lower printed circuit plate 382 made of glass impregnated epoxy resin, and side card guides 384 held together by screws 386 as a subassembly. Side card guides 384 have a beveled front surface 385 to locate the punched card laterally on the printed circuit. Mounted on the front surface 381 of lower mounting plate 380 is a front card guide 387 which, as shown in FIGURE 1, has an arch shaped upper surface 388. Card ejecting plate 392, also shown in FIGURE 10, is parallel to and immediately behind front card guide 387. Lower end 394 of card ejecting plate 392 is secured to bracket 396 and base plate 304, and upper end 398 extends slightly above arched surface 388 of front card guide 387 when the card is to be ejected, but otherwise is flush with or lower than upper surface 389 of lower printed circuit plate 382. Plates 380 and 382 contain a groove (not shown) which has edges spaced from card ejector plate 392 to be movable vertically while card ejector plate 392 is fixed relative to base plate 304.

The printed circuit, as shown in FIGURE 5, comprises strips 401 when using the conventional IBM type card which are formed on upper surface 389 of lower printed circuit plate 382. Wiring to the lower printed circuit on surface 388 is soldered directly to the top surface of the circuit strips at the edges of plate 382.

At the four corners of lower mounting plate 380 are apertures through which bushings 390 are inserted as shown in FIGURES 1, 3 and 6. The inside bores of bushings 390 have special bearing surfaces which, in combination with the precision stainless steel guide rods 312, 313, 314 and 315 provide low-friction sliding bearings. On each of guide rods 312–315 between top plate 310 and bushings 390 a spring 400 is provided to urge lower mounting plate downwardly against the upper surface on cams 320 and 322 as best shown in FIGURE 6.

To assure that the punched card is inserted in a correct position, roll pin 402 is provided at the back left-hand corner of the card reaching area. Pin 402 is secured in lower mounting plate 380 as shown in FIGURE 8 and extends through lower printed circuit plate 382 and into an aperture in contact pin retaining plate 358. Pin 402 prevents complete card entry unless the cut corner of the IBM type card is leading and on the left.

When the card has been inserted correctly through the slotted opening above front card guide 387 and beneath contact pin retaining plate 358, the card-in-place limit switch CIP–LS on the rear wall of the card reader will close in preparation for starting up operation of the weighing apparatus as fully described in said copending application Serial No. 760,107.

As the card is placed in the card reader, handle 302 is rotated clockwise as viewed in FIGURE 6 to cause cams 320 and 322 to force lower mounting plate 380 upwardly against the compression force of springs 400. The card, which rests on surface 389 of lower printed circuit plate, then is raised upwardly against pins 370 to the bottom surface 404 of pin retaining plate 358. Where a hole has been previously punched in the card under a pin, the pin contacts the correspondingly positioned conductive strip of the printed circuit on surface 389 of lower printed circuit plate 382. All the other pins 370 in the column are pushed upwardly into pin retaining plate 358 and do not complete any electrical circuit. The twelve pins 370 correspond to twelve switches in the control circuit described in said copending application Serial No. 760,107.

As handle 302 of the card reader is turned to raise the card into the card read position, roll pin 406 shown in FIGURE 2 which is provided on main shaft 316, abuts stop pin 408 (FIGURE 1) mounted on right side plate 308. The surfaces of cams 320 and 322 are eccentric about main shaft 316 and raise the card to its highest point of travel for reading. Roll pin 406 and stop pin 408 are so located that rotation of main shaft 316 is stopped just beyond this highest point of card travel to thereby provide, in conjunction with the force of springs 400, a toggle type lock to secure the lower mounting plate in a card reading position.

Collar 344 with pin 342 is adjustably positioned on main shaft 316 so that the limit switch contacts RC–LS close only when shaft 316 is in its over center position. The closing of contacts RC—LS occurs only when the card reader is in its card read position thereby preventing the control circuit described in said copending application Serial No. 760,107 from being energized until after the card reader has been properly operated.

After a weighing cycle has been completed and it is desired to remove the card from the card reader, main shaft 316 is rotated counterclockwise thereby opening contacts RC–LS. Guide rod springs 400 drive lower mounting plate 380 downwardly following the contour of cams 320 and 322 to the card entry position. At this point roll pin 326 engages the spring loaded ejector shaft 332. To eject the card, the operator forces handle 302 and main shaft 316 counterclockwise against the bias of spring 340 to drive down lower mounting plate 380 and front card guide 387 to its lowest position so that the upper end 398 of card ejection plate projects above upper arched surface 388 of the card guide 387. This causes the front edge of the card to clear front card guide 387, and the switch actuator 376 of limit switch CIP–LS then snaps the card forward to a position where the card is easily withdrawn from the reader.

The ejector spring 340 then returns main shaft 316 to its card entry position as soon as the operator releases the handle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and resired to be secured by United States Letters Patent is:

1. A card reader comprising relatively movable first and second printed circuit plates that are normally disposed a predetermined distance apart to define a card rereceing space between them, a plurality of spring biased pin contacts extending between said plates and mounted on one of said printed circuit plates adapted to complete electrical circuits determined by the location of punched holes in a card in said space, means for positively moving one of said printed circuit plates toward and away from the other of said printed circuit plates with a punched card in said space, a normally open circuit control switch in said reader, and means actuated by said means for moving said one printed circuit plate for closing said switch only after said printed circuit plates have assumed substantially the relative position wherein the pin contacts on said one plate project through the card to engage the other plate.

2. In a card reader: relatively movable upper and lower plate assemblies; said upper plate assembly comprising a first plate of insulating material having printed on one side thereof parallel strips of conductive material, a second plate of insulating material on said one side of said first plate and having a plurality of through apertures in alignment with said parallel strips, spring means extending through said apertures and contacting said strips, a third plate of insulation material mounted to be adjacent to but spaced from said second plate having a plurality of through apertures in alignment with the through apertures in said second plate, contact pins extending through the apertures in said third plate and having shoulders on one side thereof in contact with said spring means and pointed ends extending on the other side of said third plate; said lower plate assembly comprising a fourth plate of insulating material having printed on one side thereof parallel strips of conductive material; and means for mounting said fourth plate parallel to and underneath said third plate with said parallel strips in alignment with the pointed ends of said contact pins.

3. In a card reader having a fixed upper printed circuit plate and spring biased pins extending downwardly toward a lower printed circuit plate, a main shaft mounted for rotation beneath said lower printed circuit plate; eccentric cam means on said main shaft for moving said lower plate upwardly to contact said pins when the card reader is in a read position and downwardly for permitting insertion of a card in said card reader; card guide means including a front card guide plate secured to move upwardly and downwardly with said lower plate; and card ejection means comprising a stationary member mounted adjacent to but behind said front card guide plate and adapted to project through said lower plate to raise the front edge of a card in said reader when said main shaft is rotated to move said lower printed circuit plate to its lowermost position.

4. The card reader defined in claim 3 further having a card-in-place indicating switch mounted on said lower plate having a spring biased actuator displaced by the rear edge of a card when in a card reading position in said card reader to snap the card from said card reading position as the front edge of the card is raised above the front card guide plate by said card ejection member.

5. The card reader defined in claim 3 further comprising a spring biased card ejector shaft, means on said main shaft for displacing said card ejector shaft when said main shaft is rotated to cause ejection of a card from the card reader whereby said card ejector shaft forces said main shaft back to a card receiving position after removal of an ejected card.

6. In a card reader having a first printed circuit plate and spring biased movable pins extending away therefrom toward a second printed circuit plate, means spring biasing said plates away a predetermined distance from each other to provide a card receiving space between them, means for moving said second plate bodily to contact pins projecting through a punched card in said space, and means for holding a card properly located in said space comprising a relatively stationary member mounted to engage one edge of said card and a compression spring engaging the opposite edge of said card, and means for separating said plates a distance slightly greater than said fixed distance for freeing said one edge of said card from said stationary member and enabling said compression spring to eject the card at least partially from said space.

7. In the card reader defined in claim 6, said card reader comprising an electric switch, and said compression spring being the actuator of said switch whereby when said compression spring is compressed by location of the card in said space said switch is closed, and said switch is opened when said compression spring expands to eject said card.

8. A card reader comprising relatively movable upper and lower printed circuit plates spring biased a predetermined distance apart to define a punched card receiving space, a plurality of spring biased pin contacts disposed between said plates and mounted on one of said printed circuit plates and adapted to complete electrical circuits determined by the location of punched holes in a card in said space, means including a shaft mounted for rotation and mounting cam means for moving one of said printed circuit plates toward and away from the other of said printed circuit plates, a normally open circuit control switch mounted in said reader, and means on said shaft for actuating said switch in timed relation to relative movement of said plates to close said switch only when said printed circuit plates are in the relative position wherein said movable plate engages said pin contacts that project through the punched card from said other plate.

9. In a card reader having a fixed upper printed circuit plate and spring biased pins extending downwardly toward a lower printed circuit plate, said plates having a punched card receiving space between them, means including cam means operatively associated with said lower printed circuit plate for moving said lower plate upwardly to contact said pins that project through a card in said space and downwardly for permitting insertion of a card into said space below the pins, resilient stop means for arresting said plate moving means when said plates are spaced apart a predetermined distance to permit insertion of a card into said space, and means overcoming said resilient stop means for actuating said cam means further to separate said plates more than said predetermined distance apart and for sequentially automatically ejecting said card at least partially from said space.

References Cited in the file of this patent

UNITED STATES PATENTS

| | | |
|---|---|---|
| 2,870,400 | Hickok | Jan. 20, 1959 |
| 2,903,529 | Hanthorn | Sept. 8, 1959 |